3,273,465
POWER STEERING MECHANISM
Robert T. Eddy, South Bend, Ind., assignor to The Bendix Corporation, South Bend, Ind., a corporation of Delaware
Filed Nov. 30, 1964, Ser. No. 414,566
8 Claims. (Cl. 91—375)

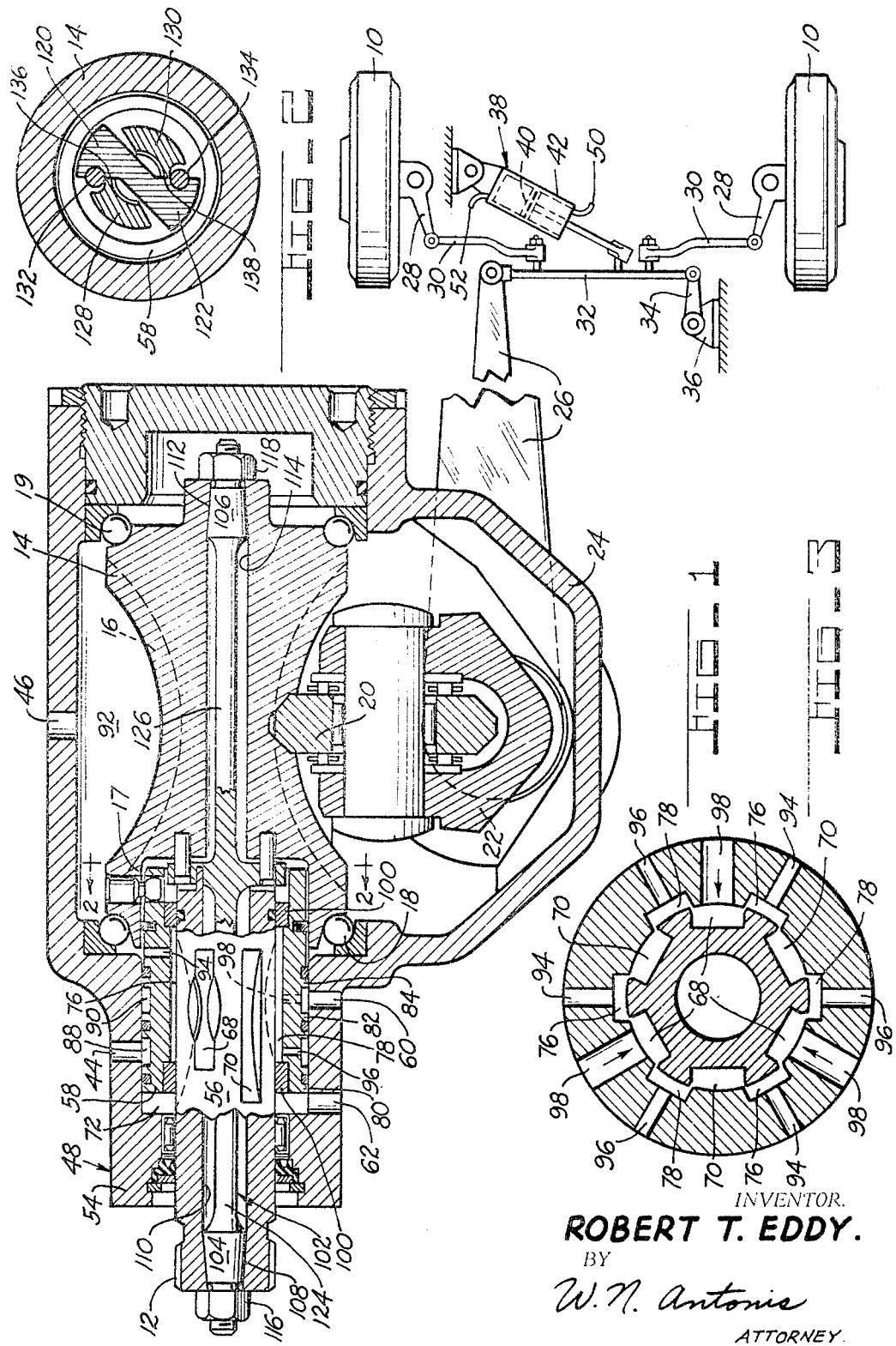

This invention relates to power steering and more particularly to a unique mechanical reaction arrangement for providing "feel" in connection with a power steering mechanism.

One of the objections of present integral or semi-integral power steering installations which utilize torsion bars to provide mechanical "feel" is that such installations do not have a definite center feel and that it takes too long to build up the desired effort levels during various steering maneuvers. Another objection is that such installations do not provide adequate returnability to the central or straight ahead position after completion of a steering maneuver.

Accordingly, it is an object of this invention to provide a torsion bar mechanical "feel" arrangement for use in a power steering arrangement which will overcome such difficulties.

In other words, it is an object of this invention to provide a torsion bar mechanical "feel" arrangement which will provide a definite center feel, immediate gradual increasing effort levels during a turning maneuver, and improved returnability to center after a turning maneuver has been completed.

Another object of this invention is to provide a torsion bar mechanical "feel" arrangement which will overcome steering wheel inertia and seal drag in the power steering valve.

A further object of this invention is to provide a mechanical "feel" arrangement which utilizes a preloaded torsion bar for achieving the desired results.

More specifically, it is an object of this invention to provide a torsion bar arrangement for providing "feel" wherein said torsion bar is in effect separated into two independent torsionally preloaded sections, one of which will be further twisted to provide increased torsional reaction when the steering wheel is turned in one direction and the other of which will be further twisted to provide increased torsional reaction when the steering wheel is turned in the opposite direction.

The above and other objects and features of this invention will be apparent from the following description of the mechanism taken in connection with the accompanying drawing which forms a part of this specification and in which:

FIGURE 1 is a sectional view of a power steering unit, constructed in accordance with the present invention, which is shown in association with parts of a vehicle drawn schematically;

FIGURE 2 is a sectional view taken substantially along line 2—2 of FIGURE 1; and FIGURE 3 is a composite sectional view which shows the power steering valve passages moved into the same plane for purposes of more clearly illustrating the flow paths within the valve.

Referring to FIGURE 1, it will be seen that reference numeral 10 designates the front wheels of a vehicle to be steered by rotation of the steering shaft (not shown) which is suitably connected to the input shaft 12. Operatively connected to the input shaft 12 is an hourglass worm 14 having a groove type cam track 16 formed thereon and a bore 17 located within and at one end thereof which extends substantially to the bottom of the cam track without interfering therewith, said worm being held against axial displacement by radial thrust bearings 18 and 19 located at each end of the worm. A roller sector gear 20 is arranged to engage the cam track 16 of the worm and is carried by one end of a sector shaft 22 which is suitably journalled in gear housing 24. A pitman arm 26 is connected to the other end of the sector shaft 22 and to the spindle arms 28 of the wheels 10 through a steering linkage assembly which includes tie rods 30, a cross tie rod 32 and an idler arm 34 suitably pivoted at one end to the vehicle frame 36.

The hydraulic system of the power steering mechanism includes a fluid motor 38 which may be connected between the cross tie rods 32 and the vehicle frame 36, as shown in FIGURE 1. However, the fluid motor may be located at any other suitable position, e.g., integral with the steering gear housing. A piston 40 divides cylinder 42 into opposed chambers constantly communicating respectively with cylinder ports 44 and 46 of rotor valve 48 via conduits 50 and 52.

The main components of the rotary valve 48 are the valve housing 54, the rotor 56 which is formed on the input shaft 12, and the sleeve 58 which is located between the rotor and the valve housing. Located in the housing 54 are inlet port 60, outlet port 62 and the two previously mentioned cylinder ports 44 and 46. The rotor 56 contains six axially extending equally spaced slots formed on the outer periphery thereof, three of which are pressure slots and are designated by the reference numeral 68 and the other three of which are return slots and are designated by the reference numeral 70. It will be noted that the return slots 70 are longer than the pressure slots 68 so that the return slots may communicate with the return chamber 72 located at one end of sleeve 58.

Located on the inner periphery of valve sleeve 58 are six axially extending equally spaced slots, three of which are designated by the reference numeral 76 and the other three of which are designated by the reference numeral 78. Formed on the outer periphery of valve sleeve 58 are three annular lands 80, 82 and 84 and two annular grooves 88 and 90. Since sleeve 58 etxends into the bore 17, it is possible to eliminate the fourth annular land and third annular groove, both of which are normally common to rotary valves of this general type, as typified by Davis Patent No. 1,947,973. In view of the arrangement shown, it is possible to communicate steering gear cavity 92 with sleeve slot 76 via radially extending passages 94 without the necessity of utilizing an annular groove on the valve sleeve since radially extending passages 94 open directly into the steering gear cavity. On the other hand radially extending passages 96 communicate sleeve slots 78 with annular groove 88. Radially extending passages 98 communicate rotor slots 68 with annular groove 90. Thus, it can be seen from the drawing, particularly FIGURE 3, that when the rotary valve 48, which is an open center valve, is in a neutral straight ahead position, flow will occur from inlet port 60 to outlet port 62 via annular groove 90, radially extending sleeve passages 98, axially extending rotor slots 68, axially extending sleeve slots 76 and 78, axially extending rotor slots 70 and return chamber 72. Cylinder port 44 communicates with sleeve slots 78 via radial sleeve passages 96 and annular grooves 88 whereas cylinder port 46 communicates with sleeve slots 76 via radial passages 94 and steering gear cavity 92.

Seals are located in annular lands 80, 82 and 84 to prevent leakage thereacross. These seals are glass filled "Teflon" endless sealing rings of rectangular section. Stopoff rings 100 seal off the axially extending sleeve slots 76 and 78 and also serve as bearings.

The three equally spaced flow paths previously described give balanced forces within the valve due to fluid flow thereby eliminating any stickiness due to hydraulic unbalance. Upon rotation of the steering wheel, valve rotor 56 is rotated relative to the valve sleeve 58. This movement is in proportion to the input torque. As can more clearly be seen by reference to FIGURE 3, relative rotation between valve rotor 46 and valve sleeve 58 will cause one of the cylinder ports 44, 46 to communicate with the inlet port 60 and the other cylinder port to communicate with the outlet port 62. This will create a differential pressure across piston 40 and will result in power assisted steering.

A torsion bar 102 having oppositely disposed conical tapers 104 and 106 formed thereon, the first of which sealingly engages conical taper 108 formed in the bore 110 of the input member 12 and the second of which sealingly engages conical taper 112 formed in the bore 114 of the worm 14, is locked at one end to the input member 12 through means of a nut 116 threaded thereon and at the other end to the worm through means of a nut 118. Locking of the torsion bar to its mating members is accomplished simply by tightening nut 116 against input member 12 and the nut 118 against the worm 16. This mode of attachment permits field replacement of any damaged input parts, the elimination of torsion bar seals, and the elimination of eccentric trim pins.

Referring to FIGURES 1 and 2, it will be noted that the torsion bar 102 has two radially extending arms 120 and 122 located between the ends thereof which in effect separate the torsion bar into two sections, namely, upper section 124 and lower section 126. These radially extending arms are located between bifurcations 128 and 130 formed at the lower end of the input member 12. A pair of anchor pins 132 and 134 are rigidly connected to the worm 14, one of which is located between radially extending arm 120 and bifurcation 128 and the other of which is located between radially extending arm 122 and bifurcation 130. In order to torsionally preload the upper and lower sections 124 and 126 of the torsion bar, each end of the torsion bar is twisted in the same direction, namely, in that direction which will cause the arms 120 and 122 of the torsion bar to be urged against anchor pins 132 and 134. As can be seen from the arrangement shown in FIGURE 2, this direction will be the counterclockwise direction. When the desired amount of torsional preload is reached, the torsion bar ends are locked in this preloaded condition by tightening the nuts 116 and 118 against the input member 12 and worm 14, respectively.

With the foregoing in mind, mechanical "feel" will be provided in the following manner: Counterclockwise rotation of the input shaft rotor 12 will cause the upper section 124 of the torsion bar to twist further. The twisting forces which arise upon such counterclockwise rotation are in effect applied at the uppermost locked end of the torsion bar to cause further twisting of the upper section 124 between locked conical end 104 and arms 120, 122 which abut pins 132, 134. No additional twisting of the lower section 126 of the torsion bar will occur during such counterclockwise rotation. On the other hand, if the input shaft rotor 12 is rotated in a clockwise direction, such rotation will cause the lower section 126 of the torsion bar to be twisted further. In this instance the twisting forces which arise upon such clockwise rotation of the input shaft are in effect applied from the midpoint of the torsion bar by bifurcations 128 and 130 which are in contact with arms 120 and 122 at points 136 and 138. This causes further twisting of the lower section 126 between the arms 120, 122 (which abut the input bifurcation 128, 130) and the locked conical end 106 of the torsion bar. No additional twisting of the upper section 124 of the torsion bar will occur during such clockwise rotation.

Limited relative rotary motion between the input shaft 12 and worm 14 is permitted by virtue of the lost motion which occurs between the bifurcations 128, 130 and the pins 132, 134 when the input shaft is rotated in a clockwise direction and the lost motion which occurs between the bifurcations 128, 130 and the arms 120, 122 when the input shaft is rotated in a counterclockwise direction. Thus, in the event of power failure, a direct mechanical drive between the input shaft and the worm is achieved.

The several practical advantages which flow from this invention are believed to be obvious from the above description and other advantages may suggest themselves to those who are familiar with the art to which the invention relates.

Furthermore, although this invention has been described in connection with a specific embodiment, it will be obvious to those skilled in the art that various changes may be made in the form, structure and arrangement of parts without departing from the spirit of the invention. Accordingly, I do not desire to be limited to the specific embodiment disclosed herein primarily for purposes of illustration, but instead desire protection falling within the scope of the appended claims.

Having thus described the various features of the invention what I claim as new and desire to secure by Letters Patent is:

1. In a power steering mechanism including an input member, an output member, and a fluid motor operatively connected to said output member, the combination within a housing of a worm having groove means formed thereon, follower means operatively connected to said output member and engaging said groove means, a pair of relatively rotatable telescoped tubular elements through which fluid flow to and from said motor is controlled, one of which is a part of said input member and the other of which is connected to said worm, a torsion bar having two radially extending arms located between the ends thereof for separating said torsion bar into an upper torsionally preloaded section and a lower torsionally preloaded section, said torsion bar having the upper end thereof rigidly connected to said input member and the lower end thereof rigidly connected to said worm, a bifurcated end portion formed on said input member, said radially extending arms of said torsion bar being located between the bifurcations of said end portion, one of said bifurcations being continuously in contact with one of said arms and the other of said bifurcations being continuously in contact with the other of said arms for causing the lower section of said torsion bar to twist and increase the torsional reaction thereof when said input member is rotated in one direction, and a pair of oppositely disposed pins rigidly connected to said worm and located between said radially extending arms and said bifurcations, one of said pins being continuously in contact with one of said arms and the other of said pins being continuously in contact with the other of said arms for causing the upper section of said torsion bar to twist and increase the torsional reaction thereof when said input member is rotated in the opposite direction.

2. The power steering mechanism, as defined in claim 1, wherein portions of said bifurcations are spaced from said radially extending arms and said pins for permitting limited relative movement between said input member and said worm.

3. In a power steering mechanism including an input member, an output member, and a fluid motor operatively connected to said output member, the combination within a housing of a worm having groove means formed thereon, follower means operatively connected to said output member and engaging said groove means, a pair of relatively rotatable telescoped tubular elements through which fluid flow to and from said motor is controlled, one of which is a part of said input member and the other of which is connected to said worm, a torsion bar having radially extending arms located between the ends thereof for separating said torsion bar into an upper torsionally preloaded section and a lower torsionally preloaded section, said torsion bar having the upper end thereof rigidly connected to said input member and the lower end thereof rigidly connected to said worm, means rigidly connected to said worm and abutting said radially extending arms for causing only the upper section of said torsion bar to twist and increase the torsional reaction thereof when said input member is rotated in one direction, and means formed on said input member and abutting said radially extending arms for causing only the lower section of said torsion bar to twist and increase the torsional reaction thereof when said input member is rotated in the opposite direction.

4. In a power steering mechanism including an input member, an output member, and a fluid motor operatively connected to said output member, the combination within a housing or a worm having groove means formed thereon, follower means operatively connected to said output member and engaging said groove means, a pair of relatively rotatable telescoped tubular elements through which fluid flow to and from said motor is controlled, one of which is operatively connected to said input member and the other of which is operatively connected to said worm, a torsion bar having radially extending arms located between the ends thereof for separating said torsion bar into two sections, said torsion bar having one end thereof rigidily connected to said input member and the other end thereof rigidly connected to said worm, means rigidly connected to said worm and abutting said radially extending arms for causing only one of the sections of said torsion bar to twist and increase the torsional reaction thereof when said input member is rotated in one direction, and means operatively connected to said input member and abutting said radially extending arms for causing only the other of the sections of said torsion bar to twist and increase the torsional reaction thereof when said input member is rotated in the opposite direction.

5. In a fluid operated servo device including an input member, an output member, and a fluid motor operatively connected to said output member, the combination within a housing of a pair of relatively rotatable telescoped tubular elements through which fluid flow to and from said motor is controlled, one of which is operatively connected to said input member and the other of which is operatively connected to said output member, a torsion bar having radially extending arms located between the ends thereof for separating said torsion bar into two sections, said torsion bar having one end thereof connected to said output member, means operatively connected to said output member and abutting said radially extending arms for causing only one of the sections of said torsion bar to twist and increase the torsional reaction thereof when said input member is rotated in one direction, and means operatively connected to said input member and abutting said radially extending arms for causing only the other of the sections of said torsion bar to twist and increase the torsional reaction thereof when said input member is rotated in the opposite direction.

6. In a fluid operated servo device including an input member, an output member, a fluid motor operatively connected to said output member, and valve means for controlling the operation of said fluid motor, preloaded spring means for opposing rotation of said input member, said spring means comprising a torsion bar having radially extending arms located between the ends thereof for separating said torsion bar into two torsionally preloaded sections, said torsion bar having one end thereof connected to said input member and the other end thereof connected to said output member, means operatively connected to said output member and abutting said radially extending arms for causing only one of the sections of said torsion bar to twist and increase the torsional reaction thereof when said input member is rotated in one direction, and means operatively connected to said input member and abutting said radially extending arms for causing only the other of the sections of said torsion bar to twist and increase the torsional reaction thereof when said input member is rotated in the opposite direction.

7. In a servo mechanism having driven means, a motor drivingly connected to said driven means, and means for controlling the operation of said motor, an input member, an output member, and preloaded spring means for opposing rotation of said input member, said spring means comprising a torsion bar having one end thereof connected to said input member and the other end thereof connected to said output member, and means operatively connected to said input and output members and to said torsion bar for dividing said torsion bar into two torsionally preloaded sections, one of which will be further twisted to provide increased torsional reaction when said input member is rotated in one direction and the other of which will be further twisted to provide increased torsional reaction when said input member is rotated in the opposite direction.

8. In a mechanism having first and second relatively rotatable members, preloaded spring means for opposing relative rotation between said first and second members, said spring means comprising a torsion bar having one end thereof connected to said first member and the other end thereof connected said second member, and means operatively connected to said first and second members and to said torsion bar for dividing said torsion bar into two torsionally preloaed sections, one of which will be further twisted to provide increased torsional reaction when said first member is rotated in one direction and the other of which will be further twisted to provide increased torsional reaction when said first member is rotated in the opposite direction.

References Cited by the Examiner
UNITED STATES PATENTS

| 2,640,322 | 6/1953 | Puerner | 91—380 |
| 2,988,059 | 6/1961 | Wysong | 91—380 |
| 3,022,772 | 2/1962 | Zeigler et al. | 91—380 |
| 3,070,072 | 12/1962 | Folkerts | 91—380 |
| 3,162,263 | 12/1964 | Brown | 74—380 |

MARTIN P. SCHWADRON, *Primary Examiner.*

UNITED STATES PATENT OFFICE
CERTIFICATE OF CORRECTION

Patent No. 3,273,465                          September 20, 1966

Robert T. Eddy

It is hereby certified that error appears in the above numbered patent requiring correction and that the said Letters Patent should read as corrected below.

Column 1, line 38, for "is" read -- to --; column 2, line 17, for "value" read -- valve --; column 5, line 10, for "or" read -- of --; line 43, before "output member" insert -- input member and the other end thereof connected to said --.

Signed and sealed this 29th day of August 1967.

(SEAL)
Attest:

ERNEST W. SWIDER                          EDWARD J. BRENNER
Attesting Officer                              Commissioner of Patents